United States Patent [19]
Borovoy et al.

[11] Patent Number: 5,842,009
[45] Date of Patent: Nov. 24, 1998

[54] SYSTEM FOR AUTOMATICALLY RETRIEVING INFORMATION RELEVANT TO A USER'S SCHEDULED EVENT

[75] Inventors: Richard D. Borovoy, Boston, Mass.; Michael J. Graves; Nagabhushan Rao Machiraju, both of Cupertino, Calif.

[73] Assignee: Apple Computer, Inc., Cupertino, Calif.

[21] Appl. No.: 723,793

[22] Filed: Sep. 30, 1996

[51] Int. Cl.$^6$ ..................................................... G06F 17/30
[52] U.S. Cl. .................... 395/601; 395/963; 364/705.08
[58] Field of Search .................... 395/601, 615, 395/925, 926, 963, 331; 364/705.08

[56] References Cited

U.S. PATENT DOCUMENTS

| | | | |
|---|---|---|---|
| 4,807,154 | 2/1989 | Scully et al. | 395/329 |
| 4,819,191 | 4/1989 | Scully et al. | 395/329 |
| 5,197,000 | 3/1993 | Vincent | 395/208 |
| 5,239,466 | 8/1993 | Morgan et al. | 395/773 |
| 5,317,683 | 5/1994 | Hager et al. | 395/330 |
| 5,418,903 | 5/1995 | Lee | 395/350 |
| 5,428,778 | 6/1995 | Brookes | 395/605 |
| 5,428,784 | 6/1995 | Cahill, Jr. | 395/200.36 |
| 5,664,063 | 9/1997 | Johnson et al. | 395/101 |

OTHER PUBLICATIONS

Steve Rigney, "Good Times for All," PC Magazine Online @ http:www8.zdnet.com/pcmag/issues/1502/pcm00103.htm, Jan. 23, 1996.

David Seachrist, "Work–Free Workgroup Schedulers," *Byte* @ http://www.byte.com/art/9508/secll/ant8.htm, Aug. 1995.

MIT Media Lab, Software Agents Group:Research, "Agents Group," @ http://lcs.www.media.mit.edu/groups/agents/research.html, Feb., 1997.

*Primary Examiner*—Paul V. Kulik
*Attorney, Agent, or Firm*—V. Randall Gard

[57] ABSTRACT

Portable electronic devices containing user's calendars have proliferated. Similarly, files, web pages, databases and information sources have become commonplace. The present invention combines knowledge of the current date and time with knowledge of entries in the user's calendar to automatically generate queries against those files, databases and information sources. The results of those queries are then made available to the user in order to provide the user with additional information about the subject of the meeting, the other attendees, their employers, etc. The present invention connects multiple devices together in a passive information retrieval model, leveraging off of mobile, desktop, and server systems, context data and search and retrieval technology. The present invention is thus an automatic search and retrieval system providing its user with relevant information to a scheduled meeting or event.

15 Claims, 5 Drawing Sheets

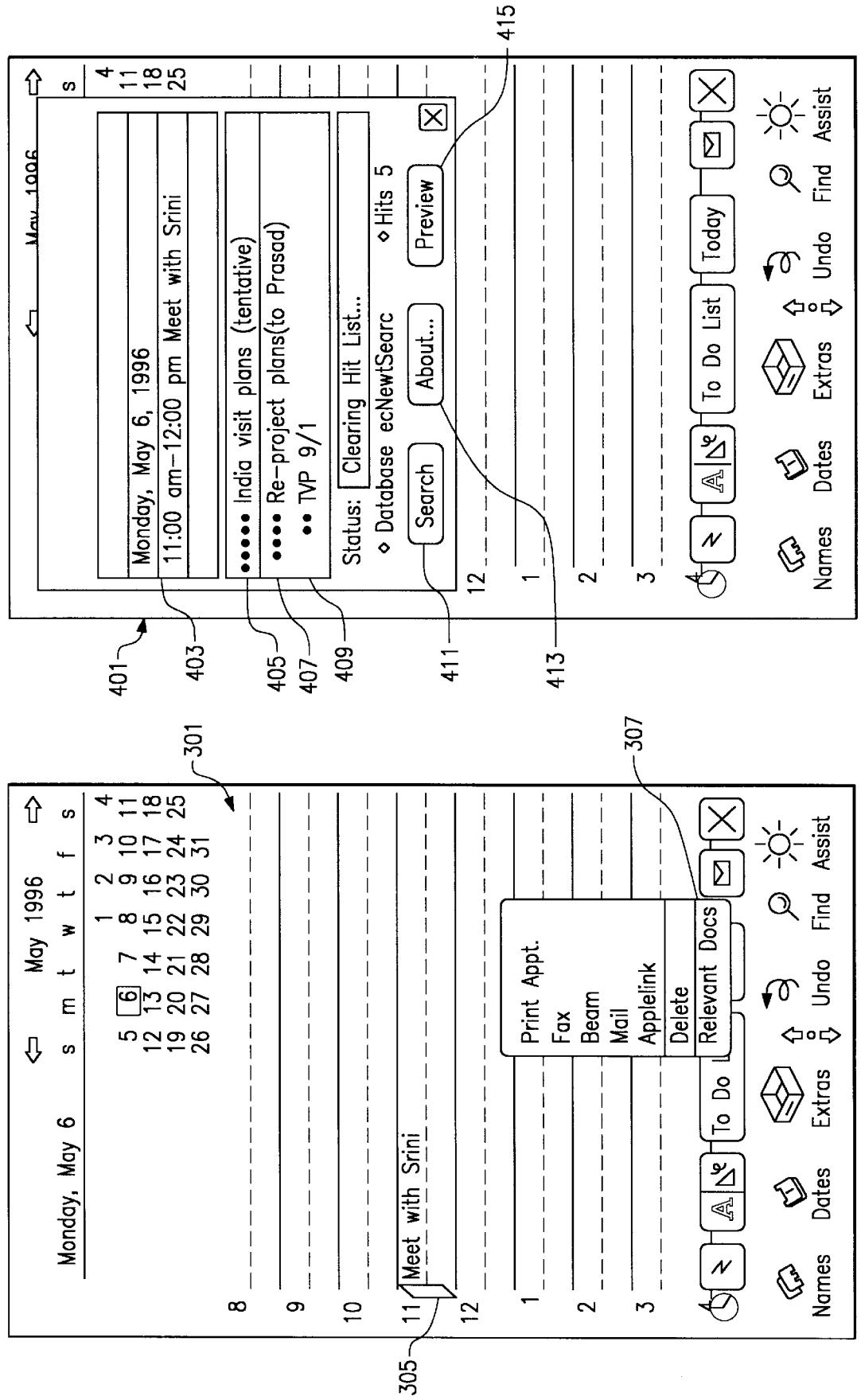

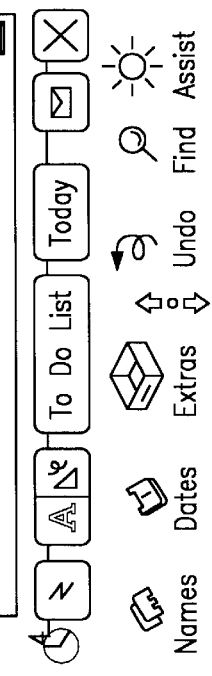
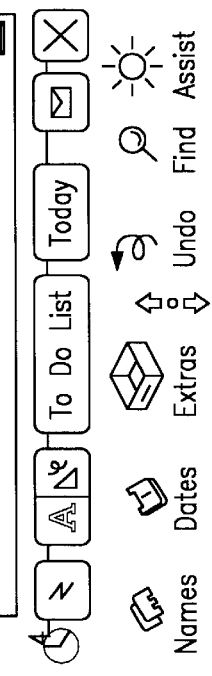
FIG. 7
FIG. 6

5,842,009

SYSTEM FOR AUTOMATICALLY RETRIEVING INFORMATION RELEVANT TO A USER'S SCHEDULED EVENT

FIELD OF THE INVENTION

The present invention relates generally to the field of information retrieval, and more particularly to automatically retrieving information which may be relevant to a scheduled meeting or event.

BACKGROUND OF THE INVENTION

It is oftentimes difficult to fully prepare oneself for a scheduled meeting or event. While it would be advantageous to have had the opportunity to fully research the subject matter or background of the attendees of a scheduled meeting, one rarely has the time to do so. Further, with the pace of modern life, it is difficult, regardless of preparation time, to be prepared for everything which might be raised in a given meeting.

In the past, primarily in the business executive ranks, lower level workers spent time preparing materials for the business executive to review in preparation for a meeting. In this way, the executive did not have to be bothered with locating relevant information yet was still kept abreast of such material. Of course, this required additional personnel, thus raising personnel costs, and to a certain extent lacked timeliness due to the inherent delay between the time relevant information was searched for and/or located and the time the executive received and/or reviewed that material.

Prior approaches at creating automated mechanisms to provide a user with information relevant to a given topic or meeting have been met with mixed results at best. One approach automatically generated an electronic compendium of articles based on a user specification of topics of interest. The user specification was either the result of explicit choices made by the user or gleaned from the user's past usage patterns. One problem with this approach is that the resulting electronic compendium may or may not be relevant to the user's activities, interests and needs at any given point in time.

Another prior approach loosely coupled a user's electronic calendar with the user's electronic telephone and address book such that whenever the user viewed a scheduled meeting, associated telephone and address book information about the other meeting attendees was made available to the user. In this way, the user of the calendar could view information about the other attendees that the user had previously entered into the telephone and address book (e.g., title, company name, etc.). Further, the user could be told of the existence of other scheduled meetings with the meeting attendees (e.g., that they were scheduled to meet again in a week or had met previously, when, where, etc.). Of course, this approach was limited to that which the user himself entered into the telephone and address book.

The present invention overcomes the inadequacies of the prior approaches by automatically searching for and retrieving information potentially relevant to a user's scheduled meeting or event. Such information can come from a wide variety of sources including published articles, press releases and database records as well as documents, memos, notes and details of previous meetings or events, many of which may have been generated by the user himself.

SUMMARY OF THE INVENTION

An objective of the present invention is to provide an improved method and apparatus for automatically providing the user with existing documents and information relevant to a scheduled event.

Another objective of the present invention is to provide an improved method and apparatus for time management which allows the user to focus more exclusively on the meeting event process rather than on the background researching tasks.

The foregoing and other advantages are provided by an electronic computing system for automatically retrieving information relevant to a scheduled event comprising a means for storing the time the scheduled event is scheduled for, a timing means for indicating when it is time to retrieve information relevant to the scheduled event based on the current time being within a predetermined time of the stored time of the scheduled event, a query formulation means for automatically formulating a query comprising details about the stored scheduled event when the timing means indicates that it is time to retrieve information relevant to the scheduled event, an information source comprising information potentially relevant to the scheduled event, a search engine for searching the information source using the automatically formulated query to identify and retrieve information from the information source relevant to the query, and a display means for the user to view the identified and retrieved relevant information resulting from the query by the search engine of the information source using the automatically formulated query.

The foregoing and other advantages are also provided by a method for automatically retrieving information relevant to a scheduled event comprising storing the time the scheduled event is scheduled for, determining that it is time to retrieve information relevant to the scheduled event based on the current time being within a predetermined time of the stored time of the scheduled event, automatically formulating a query comprising details about the stored scheduled event, searching an information source comprising information potentially relevant to the scheduled event using the automatically formulated query to identify information from the information source relevant to the query, and retrieving the identified relevant information resulting from searching the information source using the automatically formulated query.

Other objects, features and advantages of the present invention will be apparent from the accompanying drawing and from the detailed description which follows.

BRIEF DESCRIPTION OF THE DRAWING

The present invention is illustrated by way of example and not limitation in the figures of the accompanying drawing, in which like references indicate similar elements, and in which:

FIG. 3 is a screenshot of one embodiment of the present invention implemented on an Apple Newton device wherein the user can request retrieval of documents relevant to a given scheduled meeting;

FIG. 4 is a screenshot showing a window displaying an abbreviated list of retrieved documents as requested by the user;

FIG. 6 is a screenshot of an alternative embodiment of the present invention implemented on an Apple Newton device wherein the user can request retrieval of documents relevant to a given scheduled meeting as indicated by a display icon; and, FIG. 7 is screenshot showing a window displaying a retrieved document as requested by the user.

DETAILED DESCRIPTION OF THE PREFERRED EMBODIMENT

Figure 1:
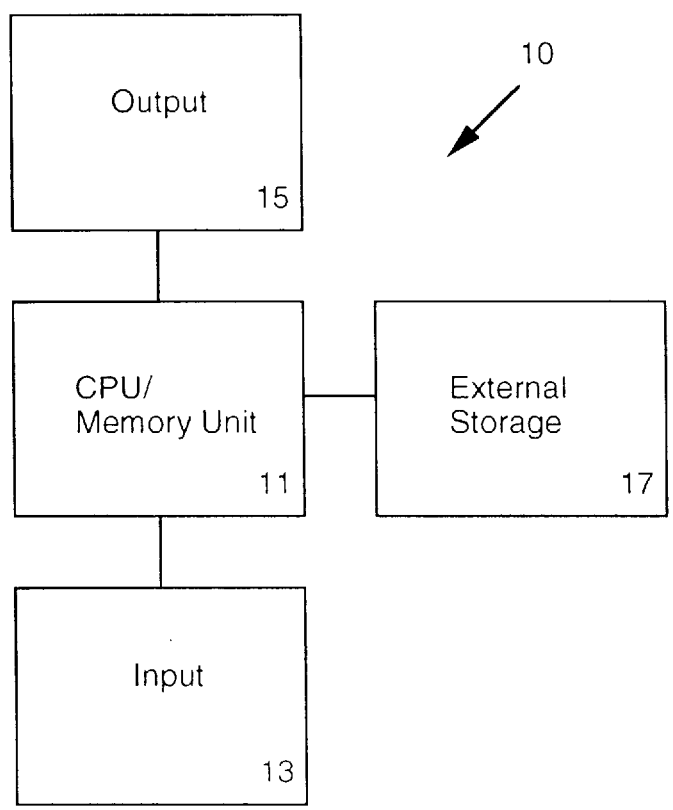
FIG. 1 is a generalized block diagram of a typical computer system 10 which might utilize the present invention.

FIG. 1 shows a generalized block diagram of a typical computer system 10 which might utilize the present invention. Computer system 10 includes a CPU/memory unit 11 that generally comprises a microprocessor, related logic circuitry, and memory circuits. Input device 13 provides inputs to the CPU/memory unit 11, which by way of example can be a keyboard, a mouse, a trackball, a joystick, a stylus, a touch screen, a touch tablet, etc., or any combination thereof. External storage 17, which can include fixed disk drives, floppy disk drives, memory cards, etc., is used for mass storage of programs and data. Display output is provided by display 15, which by way of example can be a video display or a liquid crystal display. An additional input 13 to computer system 10 would be a wired or wireless network connection to, for example, a local server via a local area network or the internet.

The present invention combines knowledge about a user's scheduled events with information retrieval in such a way as to offer a user automatic retrieval of information potentially relevant to the event he is attending. In the preferred embodiment of the present invention, a user would be provided with information relevant to a scheduled event via queries automatically generated by the system based upon the present date and current time combined with details about the particular scheduled event. The automatically generated queries would be posted to one or more available electronic sources such as the user's electronic calendar, any available electronic storage media, and any of a variety of available information sources such as private or commercial electronic databases, web pages or the like.

Figure 2:
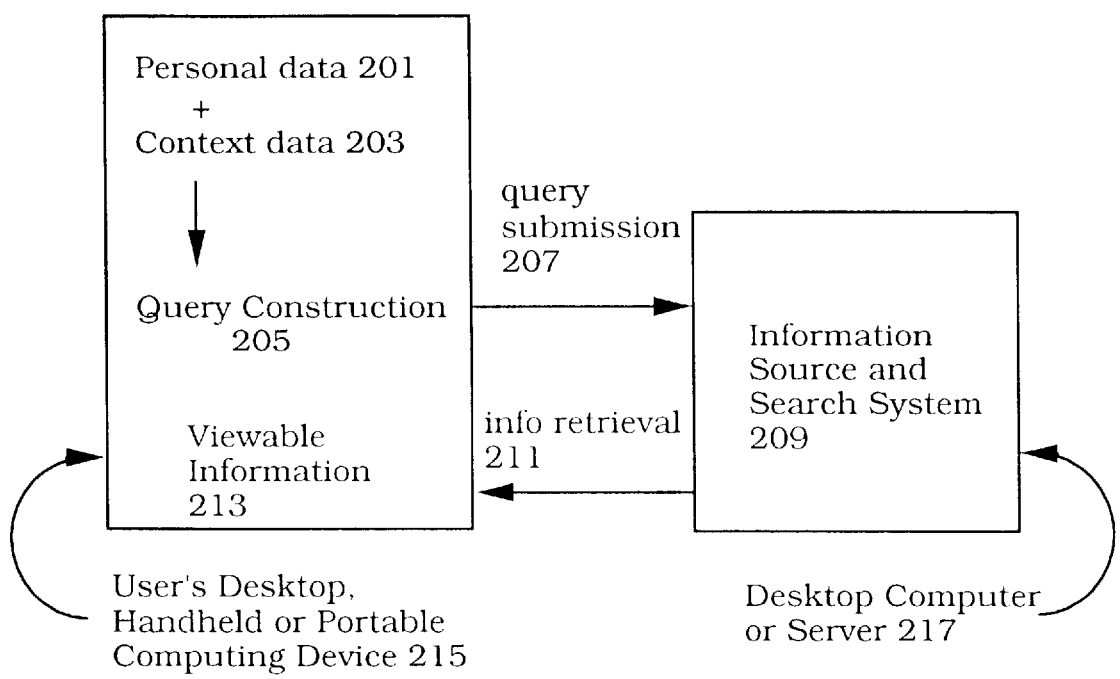
FIG. 2 is a simplified block diagram of the system of the present invention.

A simplified version of the system of the present invention, referring now to FIG. 2, combines context data 203 such as the current date and time with personal data 201 stored on the user's device 215 (e.g., calendar entries, to-do list items, notes, contact names files, etc.) to construct queries 205 which can be submitted across a wired or wireless communications connection 207 to an information source located on another computer or server 217. The other computer or server 217, after processing the query against available information sources, would return results 211 of those queries to the user's device 215. The user would then be able to view the returned information 213 on the user's device 215 as desired. Note that the user's device 215 may be a portable or handheld computing device such as an Apple PowerBook or Newton or may be a desktop computing device such as an Apple Power Macintosh desktop computer. Similarly, the information source 209 may be located on a desktop computing device 217 such as a Power Macintosh desktop computer or may be located on a remote computing server such as a Power Macintosh Server.

In one embodiment of the present invention, referring now to FIG. 3, the user would merely need to view the calendar program 301 located on an electronic portable or handheld computing device (e.g., 215 of FIG. 2), such as an Apple Newton, to see a calendar program listing of scheduled meetings or events. In the figure, a meeting 305 with "Srini" is shown to be scheduled from 11 to 12.

Note that most of the interface elements shown in the figure are not described herein as they are standard Apple Newton interface elements and, as such, are well known in the art of the present invention.

An option upon viewing or selecting the scheduled meeting 305 would be to request any retrieved documents relevant to that meeting. In one embodiment of the present invention this would be accomplished by selecting the "Relevant Docs" menu item 307.

The present invention, having formulated the search query, performed the search, and located any relevant documents, would then display those relevant documents. Referring now to FIG. 4, a window 401 listing any located and retrieved documents 405 through 409 relevant to the particular meeting 403 is displayed.

Note that although complete versions of the retrieved document(s) could be displayed at this point by the present invention, as is shown in the figure it may be more advantageous to merely display a title and/or an abstract for each retrieved document 405 through 409. In this way, the user can determine which, if any, documents 405 through 409 to review more fully by requesting a more complete view.

In the figure, three additional buttons 411 through 415 can be seen which access additional functionality of the present invention. In one embodiment of the present invention, the user could initiate a new search or alter a previous search by pressing the search button 411. Further, the user could find out more about the present invention, e.g., version number, information sources searched, etc., by pressing the about button 413. Still further, the user could view a preview of the documents retrieved, e.g., the first N lines, the first X bytes, or a larger abstract, etc., by pressing the preview button 415.

The preferred embodiment utilizes a client-server or a client-client-server model in a passive retrieval mode. More explicitly, the preferred embodiment operates primarily in the background without requiring explicit user action by automatically examining data stored on the user's portable handheld device (acting as the client device) vis-a-vis current context (e.g., date and time) to construct queries on a desktop computer (acting as the second client device) which are then posted to a database or information source located either on the desktop computer (also acting as the server device) or on a server (acting as the server device). The desktop computer or server processes the query, employing a compatible search engine, over an information base. Relevant documents or other information retrieved by the search engine are returned to the user's portable handheld device where it can be viewed by the user.

Figure 5:
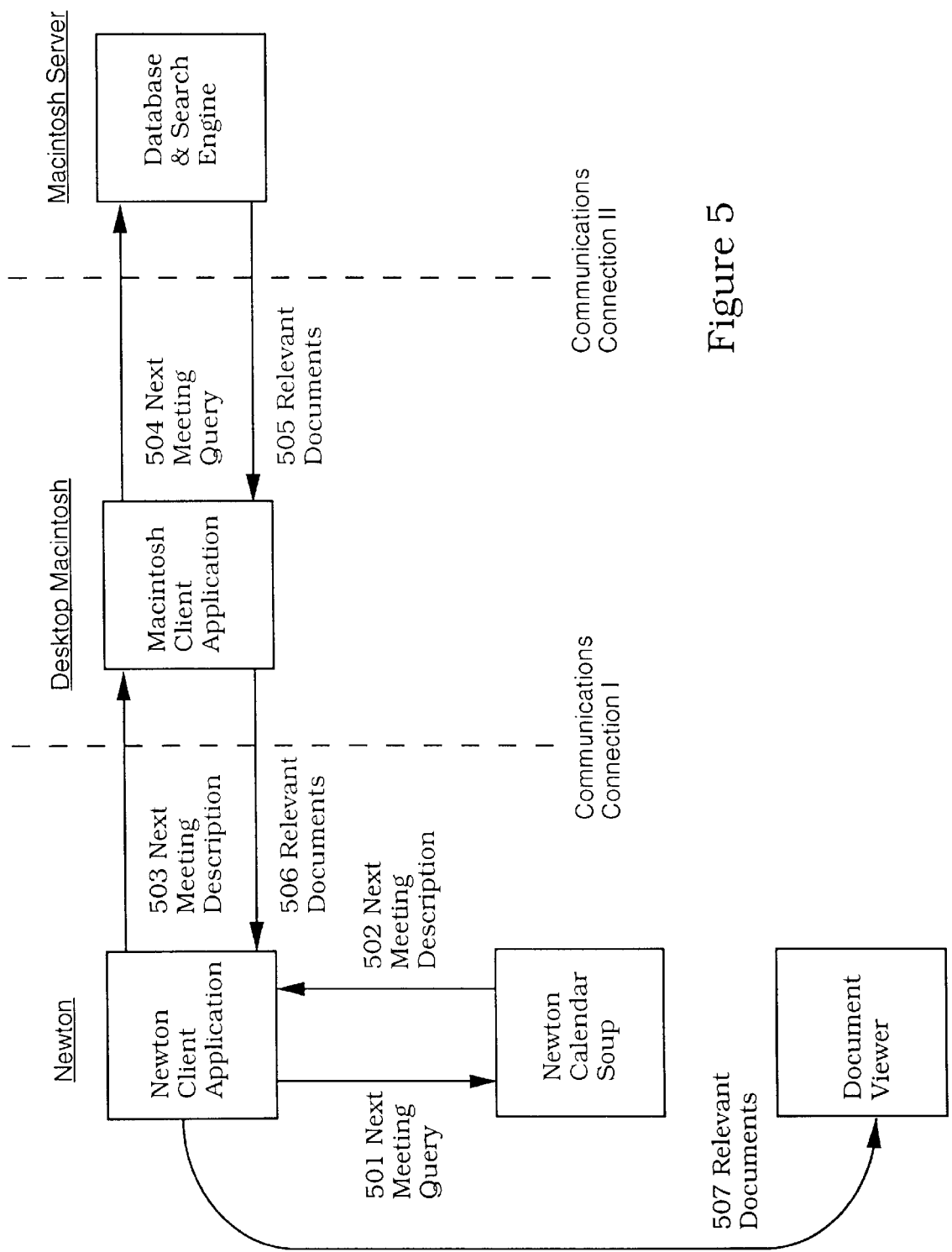
FIG. 5 is a block diagram process flow of the preferred embodiment of the present invention.

Referring now to FIG. 5, a block diagram process flow of the preferred embodiment of the present invention can be seen. The present invention, operating on a portable computing device such as an Apple Newton or PowerBook computer, first generates a query 501 of what is the next meeting. This can easily be determined by combining knowledge of the current date and time with access to and hence knowledge of the user's calendar. Additional information about a particular meeting can be gleaned by accessing the user's address book entries, to-do list items, etc.

A user settable option might be the amount of time the system of the present invention is granted to process queries in advance of the next meeting. It may be advantageous for the system to wait until only 15 minutes before a scheduled event to process queries about that event, in order to glean the most up-to-date information in return. Alternatively, that may not be preferable to a user who may want that time to review the results (or worse, needs that time to travel to the event and is unable to remain connected to the information sources during that period).

Note that obtaining information on an Apple Newton device is particularly easy to do due to the Newton's "data soup" architecture. Newton soups, as is well known in the art, allow access to data by applications other than the one that created that data. For example, if you want to query a Newton soup, you need only know its name (e.g., "calendar") and a field by which it is indexed (e.g., "mtgStartDate"). Using a standard Newton indexed query call, the present invention can retrieve information about the user's next appointment after the current time. Of course, when implemented on a computing device other than a Newton, a similar approach should be applicable to any calendar application that makes its data accessible from another application. Alternatively, the calendar application could itself implement the present invention's functionality in an embedded fashion.

The result of this query is thus a description 502 of the next meeting and could include such details as when the meeting is scheduled for, where the meeting is to be held, who else is scheduled to attend the meeting including who those other attendees work with or for, and what the topic of the meeting is.

The description of the meeting would then be passed 503 from the user's handheld portable device across communications connection I to a desktop computer. The present invention then uses the meeting description to formulate a query 504 which is passed across communications connection II to a server device. The server device uses the query 504 as input to a search engine which can access any available databases and information sources.

Note that the query 504 can be processed by any of a multitude of search systems and processes well known in the art of the present invention (see, e.g., Salton, Gerard. *Introduction to Modern Information Retrieval*, New York :McGraw-Hill, 1983). One implementation of the present invention uses Personal Library Software's Callable Personal Librarian (CPL) search and indexing engines, a system well known in the art. CPL provides full-text retrieval based on statistical methods, using an inverted index, and relevance ranked returns. Because CPL can handle natural language queries, text pulled out of the next calendar entry could be used verbatim as a database query. Further, as is common with such systems, the CPL search engine automatically eliminates stop words (e.g., "the" and "and") and distinguishes between important words (e.g., "Apple", "patent") and relatively insignificant words (e.g., "meeting").

The available databases and information sources could range from the user's own calendar file of past and future scheduled meetings with the same attendees or about the same meeting topic, to the user's own address book containing information about the others scheduled to attend the meeting, to the user's own files of documents dealing with those attendees or about the same meeting topic, to public or private databases of information about the attendees, their employers or the topic of the meeting itself, to a generalized search of the internet about the attendees, meeting topic, etc.

The located relevant documents 505, resulting from of the query search, are passed back across communications connection II to the desktop computer. The desktop computer may further process the relevant documents 505 in order to generate abstracts or abbreviated versions or may merely perform formatting operations before passing the relevant documents 506 back across communications connection I to the user's portable handheld device.

The user's portable handheld device processes the relevant documents 507 so as to make them available for viewing by the user of the present invention.

In the embodiment described above with reference to FIGS. 3 and 4, the user explicitly requested display of retrieved relevant documents which were displayed as a list of abstracts or titles. An alternative embodiment is shown in FIG. 6 wherein retrieved information is displayed in context (e.g., in the calendar program itself rather than via a separate interface mechanism). An example is shown in FIG. 6, wherein an icon 603 of a finger-pointing hand is displayed in the calendar program 601 next to the scheduled meeting 605 to indicate to the user that relevant documents have been retrieved for that meeting should the user wish to view them.

Viewing the retrieved documents could then be accomplished in a variety of ways. One approach particularly appropriate to a stylus oriented device such as the Apple Newton would be to merely tap on the hand icon 603 to display the retrieved documents. Again, the retrieved documents could be displayed in an abbreviated or abstract form, or merely by title, or in any of a multitude of ways as determined by the implementor or user of the present invention. One alternative might be to simply display a retrieved relevant document in its entirety in a separate floating window 701 as is shown in FIG. 7. This window might further include interface elements to allow scrolling or paging through the entire contents of that document as well as allowing movement to a separate retrieved relevant document.

Further modifications to the present invention include, among numerous possibilities, only retrieving documents which meet a user-defined threshold of relevancy or only searching in particular information sources or databases. In this way, only those documents deemed particularly relevant would be made available to the user thus potentially eliminating unnecessary or unwarranted documents.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specification and drawing are, accordingly, to be regarded in an illustrative rather than a restrictive sense.

We claim:

1. A method for automatically retrieving information relevant to a scheduled event comprising:
   storing the time the scheduled event is scheduled for;
   determining that it is time to retrieve information relevant to the scheduled event based on the current time being within a predetermined time of the stored time of the scheduled event;
   automatically formulating a query comprising details about the stored scheduled event;
   searching an information source comprising information potentially relevant to the scheduled event using the automatically formulated query to identify information from the information source relevant to the query; and,
   retrieving the identified relevant information resulting from searching the information source using the automatically formulated query.

2. The electronic computing method of claim 1 wherein the step of storing the time the scheduled event is scheduled for is via a program running on a portable computing device.

3. The electronic computing method of claim 2 wherein the step of determining that it is time to retrieve information relevant to the scheduled event is via a program running on the portable computing device.

4. The electronic computing method of claim 3 wherein the step of automatically formulating a query comprising details about the stored scheduled event is via a program running on a desktop computing device.

5. The electronic computing method of claim 4 wherein the step of searching an information source comprising information potentially relevant to the scheduled event is via a program running on a server computing device.

6. The electronic computing method of claim 5 wherein the step of retrieving the identified relevant information resulting from searching the information source using the automatically formulated query is via the program running on the server computing device, the program running on the desktop computing device and the program running on the portable computing device.

7. An electronic computing system for automatically retrieving information relevant to a scheduled event comprising:
   a means for storing the time the scheduled event is scheduled for;
   a timing means for indicating when it is time to retrieve information relevant to the scheduled event based on the current time being within a predetermined time of the stored time of the scheduled event;
   a query formulation means for automatically formulating a query comprising details about the stored scheduled event when the timing means indicates that it is time to retrieve information relevant to the scheduled event;
   an information source comprising information potentially relevant to the scheduled event;
   a search engine for searching the information source using the automatically formulated query to identify and retrieve information from the information source relevant to the query; and,
   a display means for the user to view the identified and retrieved relevant information resulting from the query by the search engine of the information source using the automatically formulated query.

8. The electronic computing system of claim 7 wherein the means for storing the time the scheduled event is scheduled for is a program running on a portable computing device.

9. The electronic computing system of claim 8 wherein the timing means for indicating when it is time to retrieve information relevant to the scheduled event is a program running on the portable computing device.

10. The electronic computing system of claim 9 wherein the query formulation means for automatically formulating a query comprising details about the stored scheduled event is a program running on a desktop computing device.

11. The electronic computing system of claim 10 wherein the information source comprising potentially relevant information is running on a server computing device.

12. The electronic computing system of claim 11 wherein the display means for the user to view the retrieved relevant information is on the portable computing device.

13. A system for automatically retrieving information relevant to a scheduled event comprising:
   a program for storing the scheduled event;
   a query formulation means for automatically formulating a query comprising details about the stored scheduled event when the current time is within a predetermined time period of the scheduled event;
   an information source;
   a search engine for querying the information source using the automatically formulated query to retrieve information relevant to the query; and,
   a means to display the retrieved relevant information resulting from the query by the search engine of the information source using the automatically formulated query.

14. A method of automatically retrieving information relevant to a scheduled event comprising:
   storing the scheduled event;
   automatically formulating a query comprising details about the stored scheduled event when the current time is within a predetermined time period of the scheduled event;
   querying an information source using the automatically formulated query to retrieve information relevant to the query; and,
   displaying the retrieved relevant information resulting from the query of the information source using the automatically formulated query.

15. A program storage medium having a program stored therein for causing a computer to perform the steps of:
   storing a scheduled event;
   automatically formulating a query comprising details about the stored scheduled event when the current time is within a predetermined time period of the scheduled event;
   querying an information source using the automatically formulated query to locate information relevant to the query; and,
   retrieving the located relevant information resulting from the query of the information source using the automatically formulated query.

* * * * *